United States Patent [19]

Ogasawara et al.

[11] Patent Number: 5,611,209
[45] Date of Patent: Mar. 18, 1997

[54] DEHUMIDIFIER

[75] Inventors: Yoshinari Ogasawara, Gifu-ken; Fumio Kawato, Kasugai, both of Japan

[73] Assignee: CKD Corporation, Komaki, Japan

[21] Appl. No.: 563,574

[22] Filed: Nov. 28, 1995

[51] Int. Cl.$^6$ ............................. F25D 17/06; F25B 47/00
[52] U.S. Cl. .................................. 62/93; 62/279
[58] Field of Search ............................. 62/93, 272, 279, 62/277, 281, 285, 288

[56] References Cited

U.S. PATENT DOCUMENTS

| | | | |
|---|---|---|---|
| 2,296,997 | 9/1942 | Knoy | 62/506 |
| 2,355,289 | 8/1944 | Gibson | 62/279 |
| 2,956,416 | 10/1960 | Taylor | 62/285 |
| 3,258,932 | 7/1966 | Kern | 62/93 |
| 3,359,753 | 12/1967 | Fiedler et al. | 62/93 |
| 3,585,808 | 6/1971 | Huffman | 62/93 |
| 3,818,718 | 6/1974 | Freese | 62/272 |
| 3,989,104 | 11/1976 | Newton | 165/111 |
| 4,235,081 | 11/1980 | Dowling | 62/93 |
| 4,680,938 | 7/1987 | Caley | 62/93 |

Primary Examiner—William Doerrler
Attorney, Agent, or Firm—Sheridan Ross P.C.

[57] ABSTRACT

A dehumidifier which vaporizes water separated from gas is disclosed. Relatively hot and humid air is cooled and dehumidified by a refrigerating passageway. Water separated from the hot and humid air is drained into a drainage container via a draining pipe. A plurality of fins extending radially are provided on the outer periphery of a heat radiating portion, which is a portion of a refrigerating circuit. Capillary action of the fins enables the fins to absorb water collected in the drainage container. The water contacts the radiating portion where the water is heated and vaporized.

28 Claims, 8 Drawing Sheets

DEHUMIDIFIER

BACKGROUND OF THE INVENTION

1. Field of the Invention

The present invention relates to a dehumidifier. More particularly, it pertains to an apparatus which dehumidifies gas, such as air or the like, by refrigerating it.

2. Description of the Related Art

Industrial-purpose air cylinders, which have extendable piston rods, are used for movement of mechanical devices. High precision in extension and retraction of the piston rods is required in, for instance, production system lines especially where sequential movement of related parts is involved. Therefore, prevention of rust in pressure chambers, which accommodate the piston rods, of the air cylinders is extremely important for smooth movement of the piston rods. Accordingly, it is necessary that dehumidified air be supplied to the pressure chambers of the air cylinders. Also, air must be dehumidified for hygiene purposes when, for instance, released into a patient's mouth during dental treatment. Air used in these fields are normally dehumidified by refrigerating type dehumidifiers.

A typical refrigerating type dehumidifier is generally provided with a refrigerating circuit which includes a compressor, a condenser, etc. A refrigerant is cooled in this circuit to cool air and thus dehumidify it.

More specifically, referring to FIG. 7, a typical dehumidifier 71 has a housing 74 which houses a precooling/reheating chamber 72, a cooling chamber 73, and a refrigerating circuit R for cooling of the chamber 73. A compressor 75 is connected to the refrigerating circuit R to compress refrigerant gas inside the circuit R. A condenser 76 is provided in the circuit R downstream of the compressor 75. A fan 78, connected to a motor 77, is located in the vicinity of the condenser 76. When the motor 77 rotates the fan 78, an air current is produced. This directs the air inside the housing 74 toward the condenser 76 and cools the compressed refrigerant gas supplied to the condenser 76 from the compressor 75.

A capillary tube 79 is disposed downstream of the condenser 76. The pressure of the liquefied refrigerant is lowered when it flows through the tube 79. A zigzagged refrigerating passageway 80 is provided downstream of the tube 79 inside the cooling chamber 73. Refrigerant flowing through the passageway 80 is vaporized when it cools the interior of the cooling chamber 73. The vaporized refrigerant, or refrigerant gas, is then conveyed to the compressor 75.

A cooling passage 81 defined inside the cooling chamber 73 is connected to an air supply pipe 83 by a zigzagged precooling pipe 82 provided in the precooling/reheating chamber 72. An air compressor 84, which supplies relatively hot and humid air, is connected to the supply pipe 83. A connecting pipe 85 joins the cooling passage 81 to a reheating pipe 86. The reheating pipe 86, formed in a zigzagged manner, is arranged to contact the precooling pipe 82. An air discharge pipe 87 is connected to the downstream side of the reheating pipe 86.

When the air compressor 84 is actuated, air is delivered to the cooling passage 81 via supply pipe 83 and precooling pipe 82. Heat is transferred from the delivered air to the refrigerant flowing through the refrigerating passageway 80. Subsequent to the cooling and dehumidification, the dehumidified air is sent to external devices such as air cylinders or the like via the connecting pipe 85, reheating pipe 86, and air discharge pipe 87.

Water separated from the air delivered into the cooling chamber 73 is discharged from a drain outlet 88 provided in the chamber 73. The drain outlet 88 communicates with a draining device 89 and a draining pipe 90. Water entering the drain outlet 88 is discharged into a drainage ditch 91, shown in FIG. 9, by way of the draining device 89 and the draining pipe 90.

The prior art dehumidifier 71 requires the draining pipe 90 and the drainage ditch 91 to discharge water with the draining device 89. Therefore, it is necessary to couple the draining pipe 90 to the dehumidifier 71 and to prepare a drainage ditch 91.

Furthermore, in locations where a drainage ditch 91 is not prepared, the draining pipe 90 may be connected to a drainage container 92 such as the one shown in FIG. 8 to collect water discharged by the draining device 92. However, the water which collects in the container 92 must be disposed of periodically or the container 92 itself must be exchanged with a new one when it becomes full. This results in burdensome work such as carrying the container 92 and connecting the container 92 with the draining pipe 90.

In addition, cooling by the refrigerant causes water in the ambient air to condense on the outer walls of the cooling chamber 73 and on the outer surface of the refrigerating circuit R at the sections leading into and out of the chamber 73, which are at the upstream and downstream sides of the refrigerating passageway 80. Dewdrops fall to the bottom of the housing 74 and stain the inside of the housing 74. Accordingly, it has been necessary to wrap the refrigerating circuit R with a heat insulating material to prevent heat exchange between the housing 74 and the ambient air and also between the refrigerating circuit R at the upstream and downstream sides of the refrigerating passageway 80 and the ambient air.

SUMMARY OF THE INVENTION

Accordingly, it is a primary objective of the present invention to provide a gas dehumidifier capable of processing water, separated from hot and humid air, in a facilitated manner.

Another objective of the present invention is to provide a gas dehumidifier capable of easily preventing stains in the interior of a gas dehumidifier.

A further objective of the present invention is to provide a gas dehumidifier which is more compact.

To achieve the above objectives, a gas dehumidifier having a gas passage to convey gas supplied from an external source, a first heat exchanger defined along a portion of the gas passage, and a refrigerant passage that conveys refrigerant and passes through the first heat exchanger is disclosed. Heat exchange takes place in the first heat exchanger between gas passing through the gas passage and refrigerant flowing through the refrigerant passage to cool and dehumidify the gas. The dehumidifier includes collecting means located beneath the first heat exchanger for collecting water separated from the gas during dehumidification, and vaporizing means for vaporizing water collected in the collecting means.

The present invention also includes a housing accommodating the gas passage and the refrigerant passage and a cooling chamber enclosing the first heat exchanger. The cooling chamber is located at the upper portion of the housing.

Furthermore, in another aspect of the present invention, a method for dehumidifying gas by cooling results from circulation of compressed refrigerant in a housing. The method includes the steps of cooling gas with refrigerant flowing through a refrigerant passage, which passes through a gas passage and thus separates water from the gas, collecting the water separated from the gas in a container, and vaporizing water collected in the container with heat transferred from hot compressed refrigerant passing through the refrigerant passage, which extends through the container.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

First Embodiment

A first embodiment of the present invention will hereafter be described with reference to FIGS. 1–3.

Figure 1:
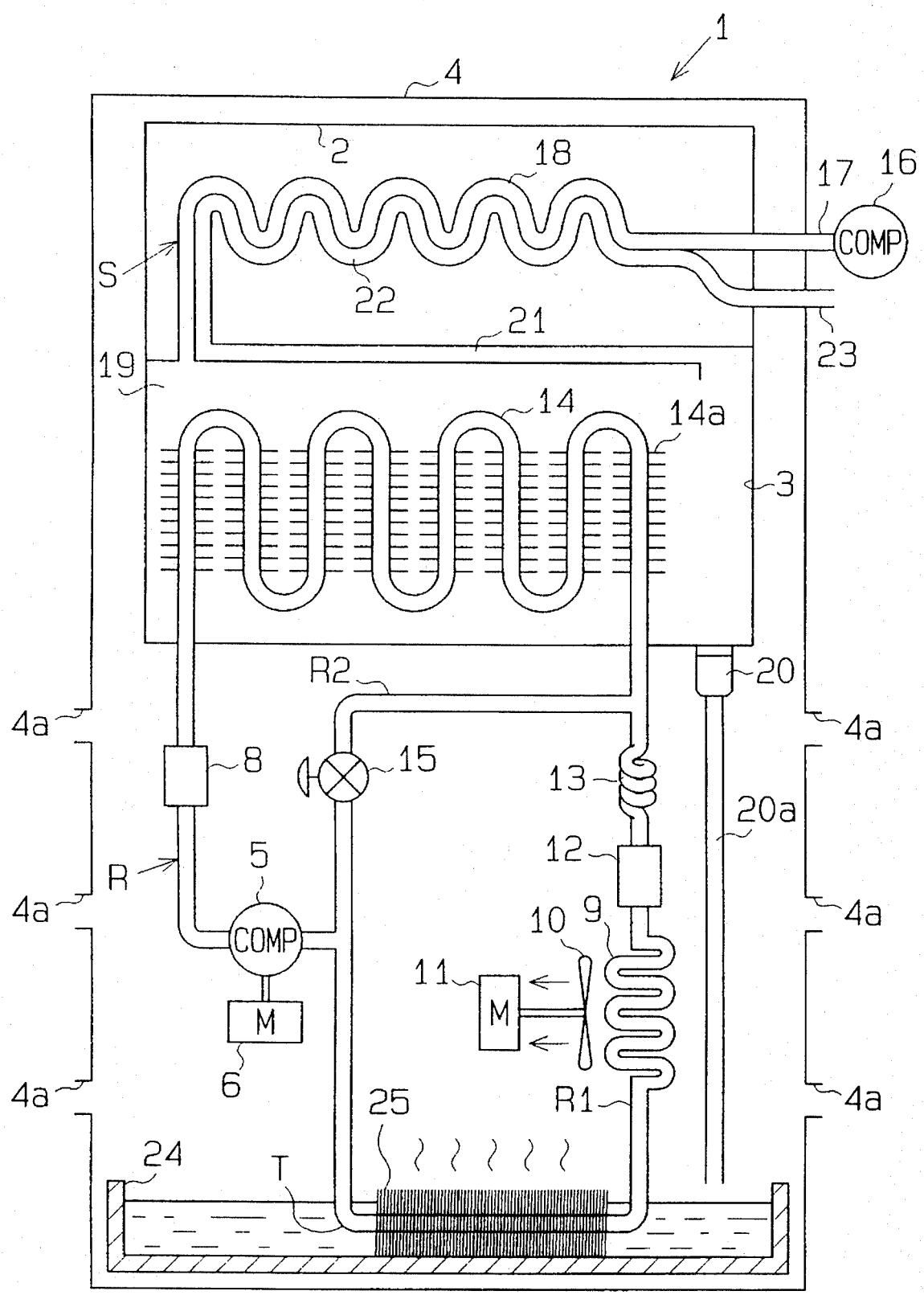
FIG. 1 is a diagrammatic structural view of a dehumidifier according to a first embodiment of the present invention.

As shown in FIG. 1, a gas dehumidifier 1 has a housing 4 which houses a precooling/reheating chamber 2, a cooling chamber 3, and a refrigerating circuit R.

The refrigerating circuit R, which cools the cooling chamber 3, is provided with a compressor 5. The compressor 5, driven by an electric motor 6, compresses refrigerant gas. An accumulator 8 is located upstream of the compressor 5 to collect liquefied refrigerant and allow transition of only refrigerant gas to the compressor 5. A condenser 9 is located downstream of the compressor 5. A fan 10, driven by an electric motor 11, is located in the vicinity of the condenser 9 to direct air surrounding the dehumidifier 1 toward the condenser 9. The produced air current cools the hot refrigerant gas, which is compressed and supplied by the compressor 5, passing through the condenser 9. A filter dryer 12 is located downstream of the condenser 9. A filter and a desiccant are incorporated in the dryer 12 to remove dust, moisture, etc. from the refrigerant passing therethrough. A capillary tube 13 is located downstream of the filter dryer 12 to lower the pressure of the liquefied refrigerant passing therethrough. A zigzagged refrigerating passageway 14 is provided downstream of the capillary tube 13 inside the cooling chamber 3. A plurality of fins 14a are attached to the passageway 14 to enhance the heat transfer effect thereof. The downstream side of the passageway 14 is coupled with the accumulator 8.

The accumulator 8, compressor 5, condenser 9, filter dryer 12, capillary tube 13 and refrigerating passageway 14 constitute a main route R1 of the refrigerating circuit R.

A bypass R2 is provided parallel to the main route R1. A volume adjusting valve 15 opens and closes the bypass R2 in accordance with pressure change at its downstream side. The valve 15 constantly maintains its downstream side pressure, or the pressure within the passageway 14, at or above a predetermined value.

The housing 4 has a plurality of ventilation holes 4a which allow air to pass between the interior and exterior of the housing 4. A drainage container 24 is provided at the bottom of the housing 4. The opening of the container 24 has a larger area than the bottom of the cooling chamber 3. The section between the compressor 5 and the condenser 9, or the heat radiating section T, is arranged substantially parallel to the bottom of the container 24.

A plurality of radially-projecting needle-like metal fins 25 are provided on the outer periphery of the radiating section T. As shown in FIG. 1, the distal ends of the fins 25 that are directly under the radiating section T are in contact with the bottom of the container 24. As shown in FIG. 3(a), an elongated aluminum plate is bent in the vicinity of its middle portion to define a base 26. The plurality of fins 25 are formed by further bending the pair of plate portions extending from the base 26 in an inward direction and cutting the plate portions in a direction perpendicular to the extending direction of the base 26. This produces a row of pairs of opposed fins 25 as seen in FIG. 3(a). The space between neighboring fins 25 is smaller at locations closer to the base 26. This results in water being absorbed by the fins 25 due to capillary action. Thus, the fins 25 form a capillarity device. The base 26 is spirally wound around the heat radiating portion T as shown in FIG. 3(b) to project the fins 25 from the radiating portion T as shown in FIG. 2. The space between fins 25 facing each other on neighboring wraps of the base 26 is determined by the dimensions of the base 26. The space between fins 25 facing each other on neighboring wraps of the wound base 26 is greater than the space between each pair of opposed fins 25.

A dehumidifying circuit S supplies relatively hot and humid air from an air compressor 16 to the cooling chamber 3 for dehumidification. The circuit S also discharges the dehumidified air from the dehumidifier 1.

An air supply pipe 17 is connected to the air compressor 16. The supply pipe 17 is connected to a zigzagged precooling pipe 18 in the precooling/reheating chamber 2. The downstream side of the precooling pipe 18 is connected to a cooling passage 19 defined inside the cooling chamber 3. When the hot and humid air passing through the cooling passage 19 comes into contact with the outer surface of the refrigerating passageway 14, heat transfer takes place. A draining device 20 is provided inside the cooling chamber 3. The draining device 20 discharges water accumulated in the cooling chamber 3 into the drainage container 24 by way of a draining pipe 20a.

A reheating pipe 22 is provided downstream of the cooling passage 19 with a connecting passageway 21 in between. The reheating pipe 22, formed in a zigzagged manner, is arranged to contact the precooling pipe 18. The downstream side of the reheating pipe 22 is connected to an air discharge pipe 23 provided at the outside of the precooling/reheating chamber 2.

The air supply pipe 17, precooling pipe 18, cooling passage 19, connecting passageway 21, reheating pipe 22, and air discharge pipe 23 constitute the dehumidifying circuit S.

The operation of the dehumidifier 1 constructed in the above manner will now be described.

Actuation of the air compressor 16 delivers hot and humid air into the air supply pipe 17. The air then flows through the precooling pipe 18, cooling passage 19, connecting passageway 21, reheating pipe 22, air discharge pipe 23, and is supplied to external devices such as air cylinders.

Refrigerant is circulated within the refrigerant circuit R when the compressor 5 is driven by the motor 6. In other words, the compressor 5 compresses low pressure refrigerant gas, thus raising the temperature of the gas (approximately 60° C.), and delivers the gas to the condenser 9. The fan 10 directs the air within the housing 4 toward the condenser 9. This cools and condenses the compressed refrigerant gas passing through the condenser 9. The compressed and condensed refrigerant then passes through the filter dryer 12, where dust and moisture are removed, and proceeds to the capillary tube 13, where the pressure of the refrigerant is lowered. When the low pressure refrigerant passes through the refrigerating passageway 14, heat is transferred to the refrigerant from the hot air passing through the cooling passage 19 in the cooling chamber 3. This vaporizes the refrigerant in the passageway 14 and produces a low pressure refrigerant gas. The refrigerant gas is then delivered to the accumulator 8.

Meanwhile, hot and humid air is cooled and dehumidified by heat exchange, and the dehumidified air is delivered to the reheating pipe 22 via the connecting passageway 21. Since the reheating pipe 22 is in contact with the precooling pipe, heat exchange takes place along this section. That is, heat exchange takes place between the dehumidified air in the preheating pipe 22 and the hot and humid air in the precooling pipe 18. This results in the precooling of the hot and humid air and the reheating of the dehumidified air.

Water separated from the hot and humid air inside the cooling chamber 3 is drained into the drainage container 24 by way of the draining device 20 and the draining pipe 20a. Furthermore, due to cooling by the refrigerant, moisture in the ambient air condenses on the outer walls of the cooling chamber 3 and the outer surface of the refrigerating circuit R at the sections leading into and out of the cooling chamber 3, or the upstream and downstream sides of the refrigerating passageway 14. The condensed dew falls into the drainage container 24. The collected water in the container 24 contacts the fins 25. The water is then absorbed by the fins due to capillary action and comes into contact with the heat radiating portion T of the refrigerating circuit R.

The high-temperature compressed refrigerant gas passing through the radiating portion T causes heat exchange with the water absorbed by the fins 25. This results in vaporization of the water. The vaporized water is discharged outside the dehumidifier 1 via the plurality of ventilation holes 4a. The absorbed water also cools the refrigerant gas in the radiating portion T for a certain degree. The fins 25, which are preferably made of aluminum, have a high thermal conductivity. Therefore, the heat of the hot refrigerant gas is effectively transmitted to the water and enables immediate vaporization of the water.

Cooling efficiency is enhanced since the refrigerant gas is cooled down to a certain degree in the radiating portion T before being sent to the condenser 9 for further cooling by the fan 10. Therefore, the condenser 9 and the fan 10 may be more compact than the prior art dehumidifiers to achieve the same cooling efficiency. In addition, the actuation of the fan 10 directing an air current toward the condenser 9 causes agitation of the air inside the housing 4 and effectively discharges the vaporized water from the dehumidifier 1 through the ventilation holes 4a.

As described above, the water separated from the air is collected in the drainage container 24 and then vaporized by the heat radiating portion T of the refrigerating circuit R. Hence, the automatic vaporization of water makes a draining ditch or periodical disposing of the water collected in a drainage container unnecessary.

The water that condenses on the outer walls of the cooling chamber 3 and the water that condenses on the outer surface of the refrigerating circuit R at the upstream and downstream sides of the refrigerating passageway 14 falls into the drainage container 24. The collected water is vaporized by the heat radiating portion T and discharged from the dehumidifier 1. This prevents formation of stains inside the housing due to water drops falling from the outer walls of the cooling chamber 3 and the outer surface of the refrigerating circuit R at the upstream and downstream sides of the refrigerating passageway 14. It also prevents water from leaking from the dehumidifier 1. As a result, covering the refrigerating circuit R and the cooling chamber 3 with a heat insulating material is unnecessary whereas such covering was necessary with the prior art dehumidifiers.

In the present embodiment, the heat radiating portion T of the refrigerating circuit R, which vaporizes the water collected in the draining container 24, cools the compressed refrigerant gas for a certain degree before the gas is conveyed to the condenser 9. Therefore, in comparison with the prior art dehumidifiers where compressed refrigerant gas was cooled only by the condenser, the cooling efficiency is enhanced. This allows the condenser 9 and the fan 10 to be more compact than the prior art dehumidifiers while achieving the same cooling efficiency.

In addition, in the present embodiment, actuation of the fan 10 produces a current of air directed toward the condenser 9 and agitates the air inside the cover 4. This results in effective discharge of the vaporized water through the ventilation holes 4a.

Furthermore, the fins 25, radially projecting from the outer periphery of the heat radiating portion T, are in contact with the bottom of the draining container 24. This allows water to be absorbed between the fins 25, due to capillary action, and come into contact with the radiating portion T regardless of the amount of water in the container 24 being small. Hence, even a small amount of water collected in the container 24 is vaporized. Additionally, the fins 25, which are made from aluminum, have high thermal conductivity and thus allow the heat of the hot compressed refrigerant gas inside the radiating portion T to be efficiently transmitted to the absorbed water. This results in immediate vaporization of the water. Also, provision of the fins 25 enlarges the heat transferring surface and enables heat to be efficiently conveyed to the absorbed water.

Second Embodiment

A second embodiment according to the present invention will now be described with reference to FIG. 4. Members which are identical with those in the first embodiment will be denoted with the same numeral. Description of these members will also be omitted.

Figure 4:
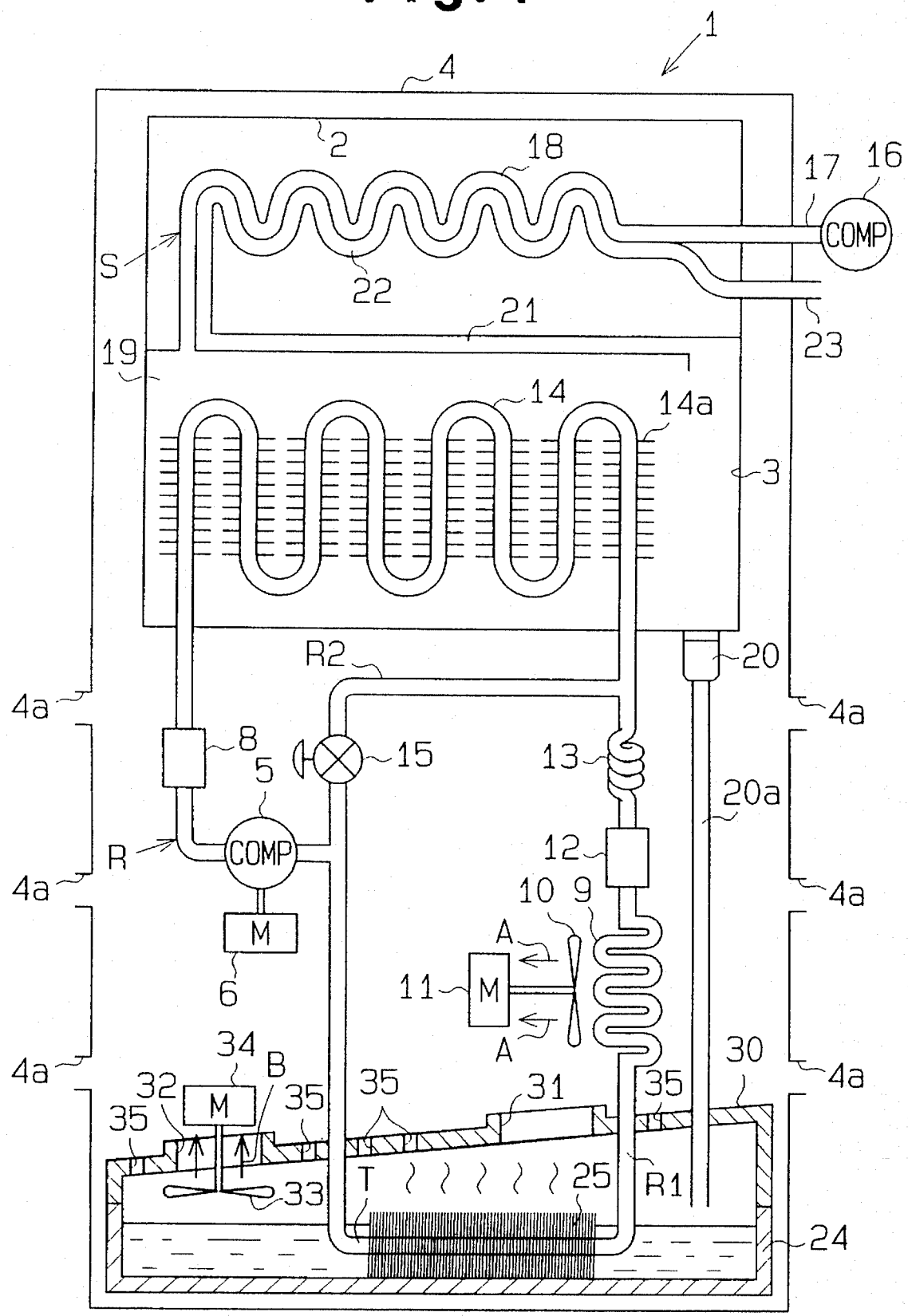
FIG. 4 is a diagrammatic structural view of a dehumidifier according to a second embodiment of the present invention.

As shown in FIG. 4, a lid 30 inclined downward from the right-hand side to the left-hand side of the drawing closes the opening of the drainage container 24. The draining pipe 20a extends through the lid 30. The sections of the refrigerating circuit R which are upstream and downstream of the heat radiating portion T lead into and out of the lid 30, respectively. The lid 30 has an air intake aperture 31, which corresponds to the fan 10, on its right side and an air discharge aperture 32 on its left side. A second fan 33, which is rotated by an electric motor 34, is provided in the vicinity of the discharge aperture 32.

A plurality of through holes 35 are formed on the lid 30. Dew condensed on the outer walls of the cooling chamber 3 and the outer surface of the refrigerating circuit R at the downstream and upstream sides of the refrigerating passageway 14 fall on the lid 30. The water then flows along the top surface of the lid 30 toward the left-hand side in FIG. 4 and then falls into the drainage container 24 through the through holes 35.

With the dehumidifier 1 constructed in this manner, the fan 10, rotated by the motor 11, produces an air current in the direction shown by an arrow A in FIG. 4. This air current cools the condenser 9. Meanwhile, the second fan 33, rotated by motor 34, produces an air current in the direction shown by an arrow B. This causes the air between the container 24 and the lid 30 to be discharged from the discharge aperture 32. The resulting negative pressure between the container 24 and the lid 30 draws the air heated by the condenser 9 therein through the air intake aperture 31. The air drawn in through the aperture 31 first heats the water collected in the container 24 and then flows out from the discharge aperture 32.

In the present embodiment, air heated by the condenser 9 and drawn into the space between the container 24 and the lid 30 heats the water collected in the container 24. Accordingly, in addition to the effects of the first embodiment, the water collected in the container 24 is further efficiently vaporized.

Figure 5B:
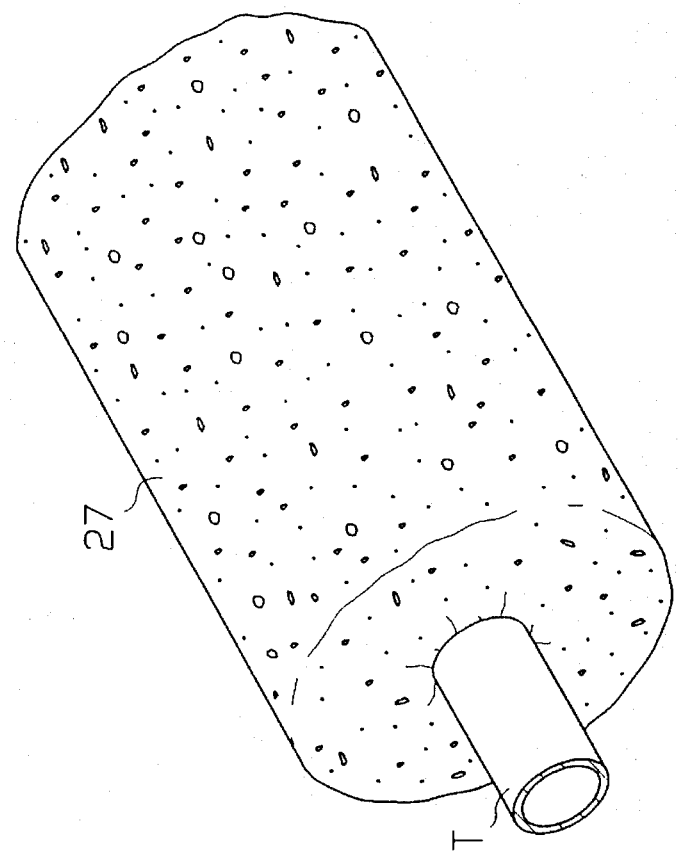
FIG. 5(b) is a partial perspective view of a poriferous body.
Figure 5A:
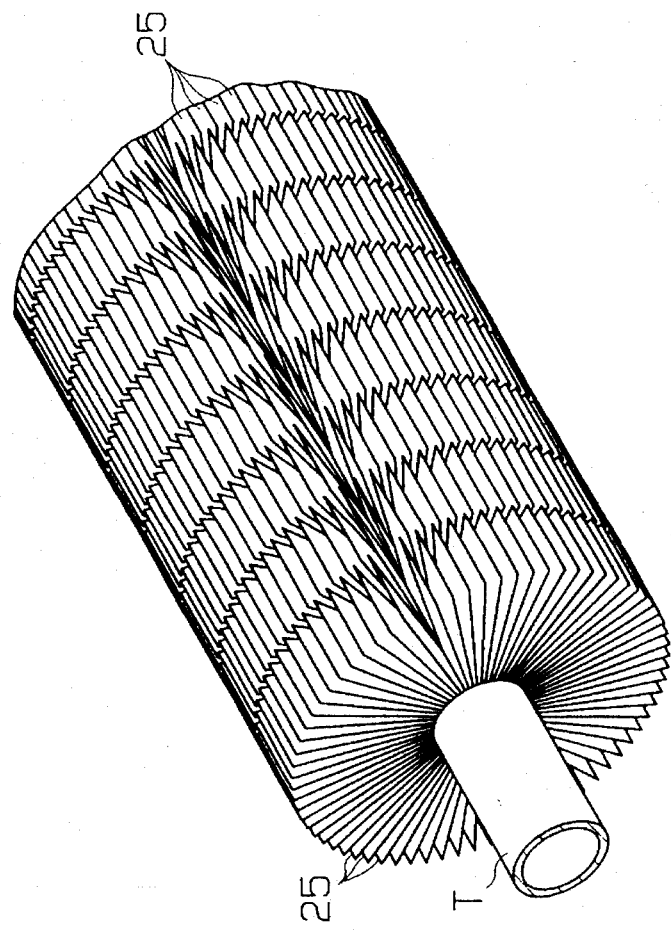
FIG. 5(a) is a partial perspective view of another example of the fins.

In the first and second embodiments, the arrangement of the fins 25 may be altered to the manner shown in FIG. 5(a). This enables the same effects of the first and second embodiments to be obtained. The gap between each fin 25 may also be narrowed. This will further improve absorption of water caused by capillary action.

A poriferous body 27, such as a sponge or the like, may be provided on the outer periphery of the heat radiating portion T instead of the fins 25 as a capillarity device. Contact of the poriferous body 27 with the bottom of the container 24 enables water collected therein to be absorbed by capillary action.

Alternatively, the fins 25 and the poriferous body 27 may both be omitted. In this case, the heat radiating portion T may be disposed in a manner where it directly contacts the bottom portion of the container 24.

Third Embodiment

A third embodiment according to the present invention will be described with reference to FIG. 6.

Figure 6:
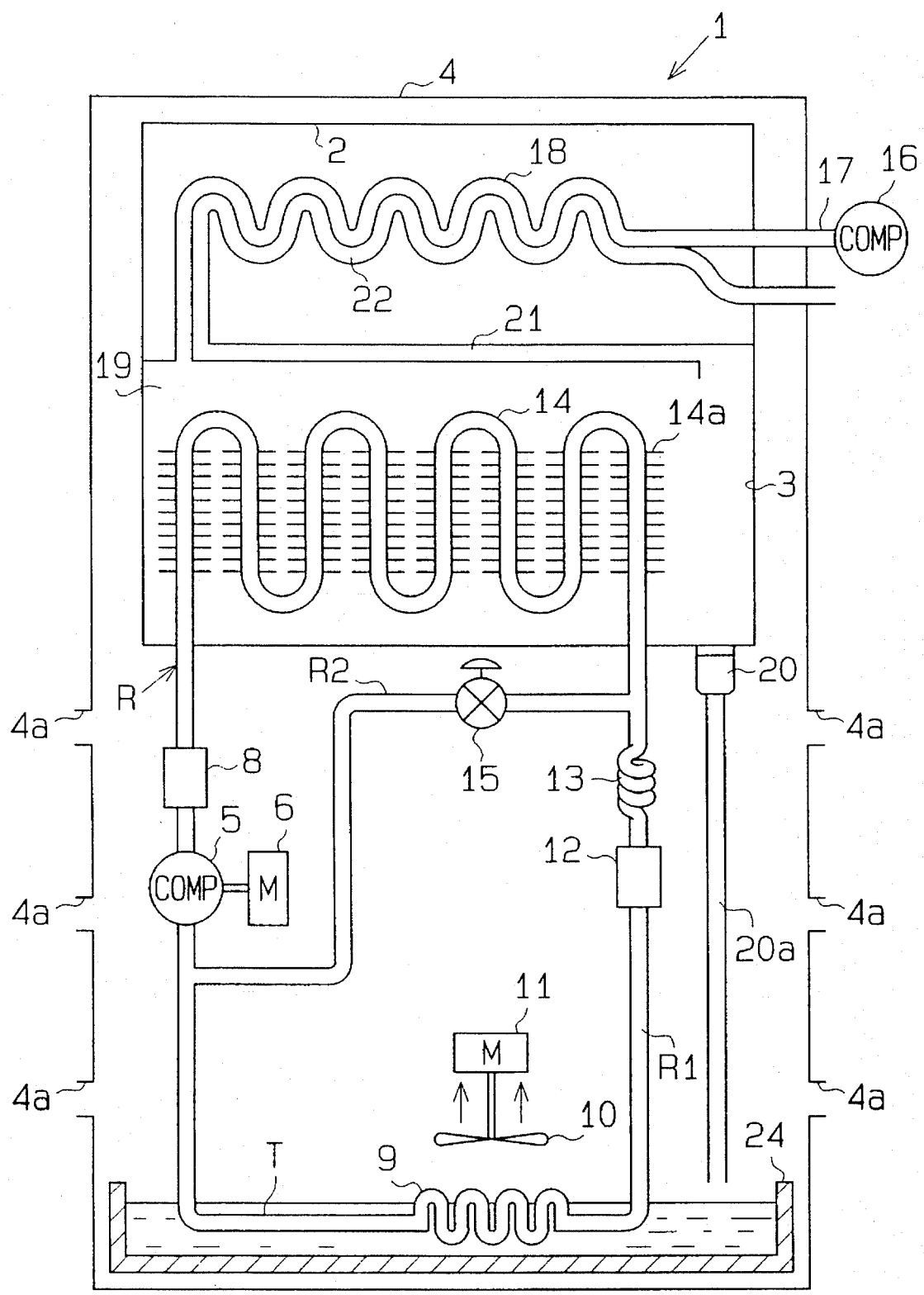
FIG. 6 is a diagrammatic structural view of a dehumidifier according to a third embodiment of the present invention.
Figure 7:
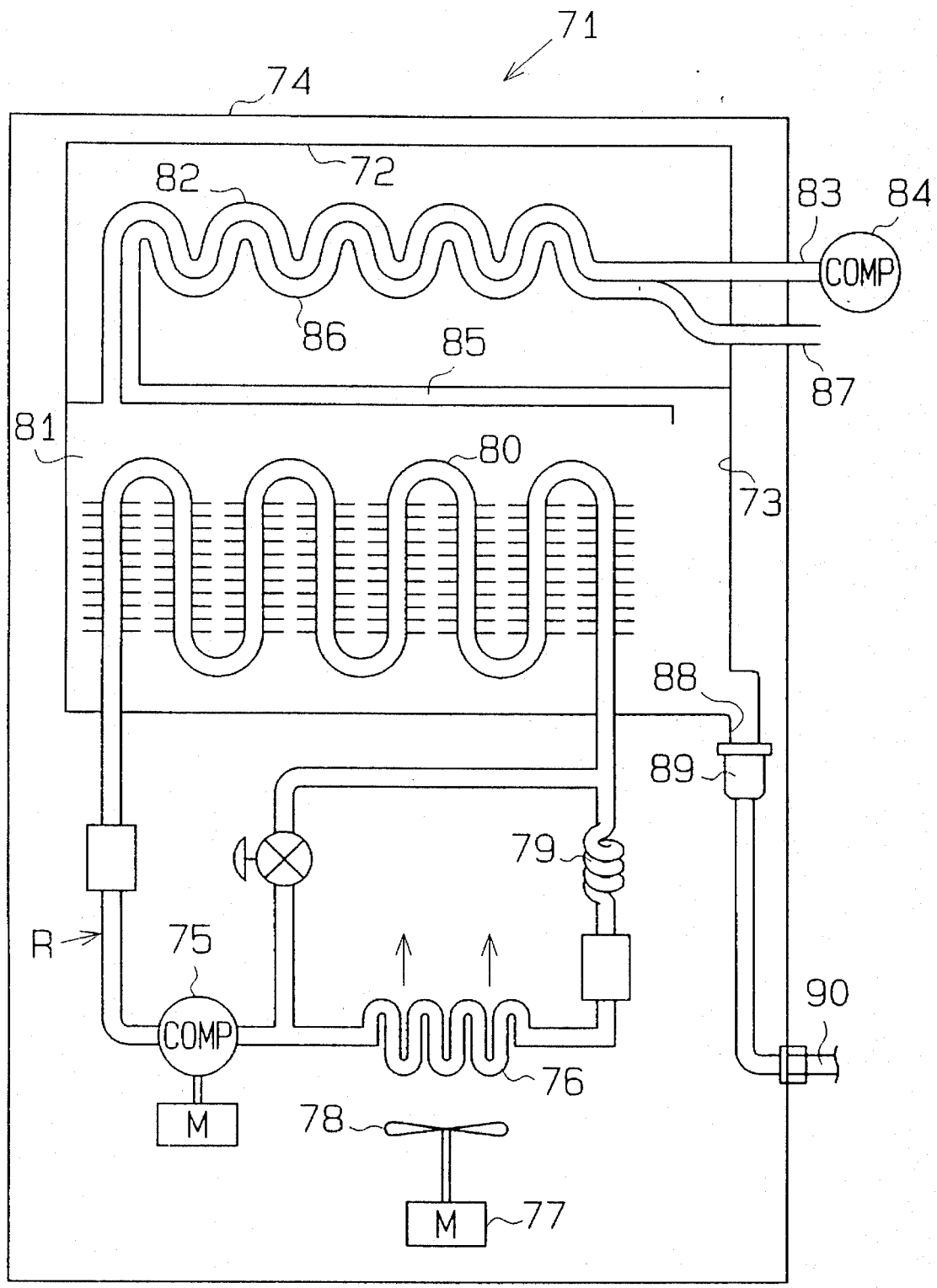
FIG. 7 is a diagrammatic structural view of a prior art dehumidifier.
Figure 9:
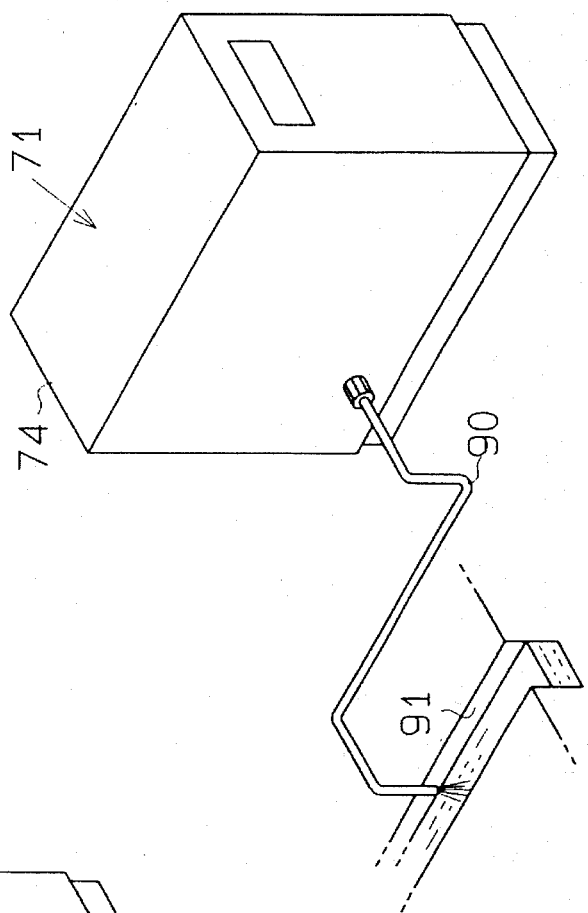
FIG. 9 is a diagrammatic perspective view showing the prior art gas with another example of a draining structure.
Figure 8:
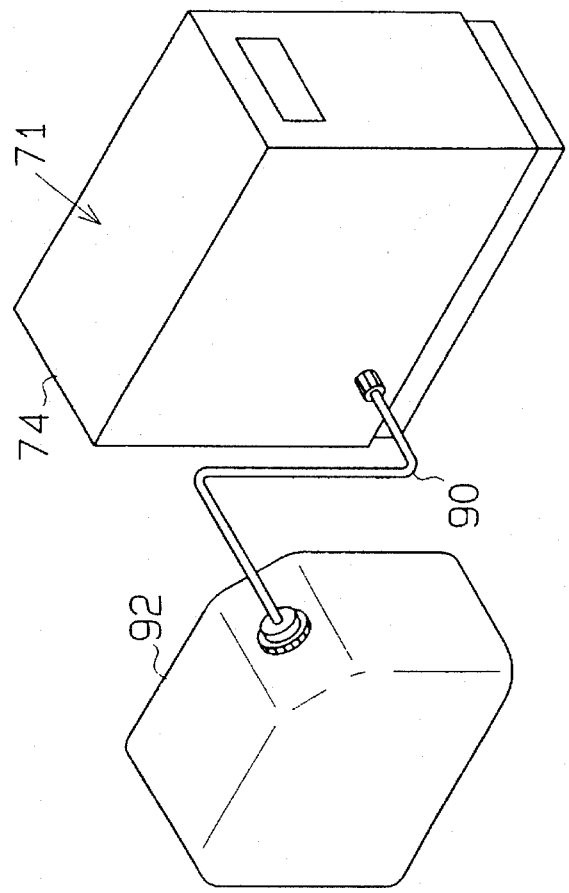
FIG. 8 is a diagrammatic perspective view showing the prior art gas dehumidifier and its draining structure.

As shown in FIG. 6, the condenser 9 is disposed in the draining container 24 parallel to its bottom surface. When water is collected in the container 24, the water contacting the condenser 9 vaporizes while the compressed refrigerant gas inside the condenser 9 is cooled by the contact between the water and the condenser 9. In other words, instead of the heat radiating portion T of the first embodiment, the condenser 9 itself is utilized as a water vaporizing means.

In this case, the condenser 9 is cooled by both the water collected in the drainage container 24 and the air current produced by the fan 10. Therefore, the cooling efficiency of the compressed refrigerant gas in the condenser 9 is improved. This allows the condenser 9 and the fan 10 to be smaller.

In the third embodiment, the heat radiating portion T of the first and second embodiments may be provided between the compressor 5 and the condenser 9. In this case, the cooling efficiency of the refrigerant gas in the condenser 9 is further improved and thus the condenser 9 and the fan 10 can be more compact.

Figure 2:
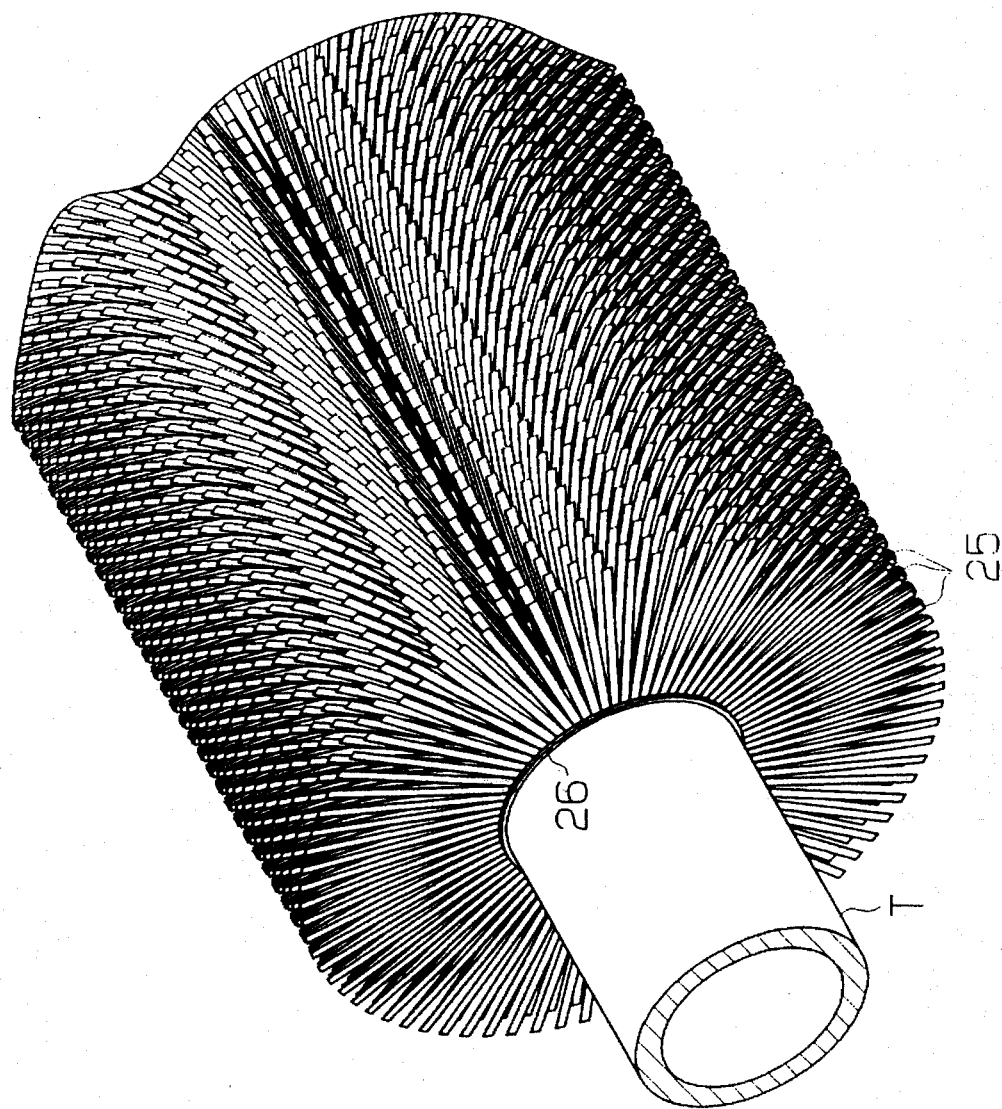
FIG. 2 is a partial perspective view showing a heat radiating section and fins.
Figure 3A:
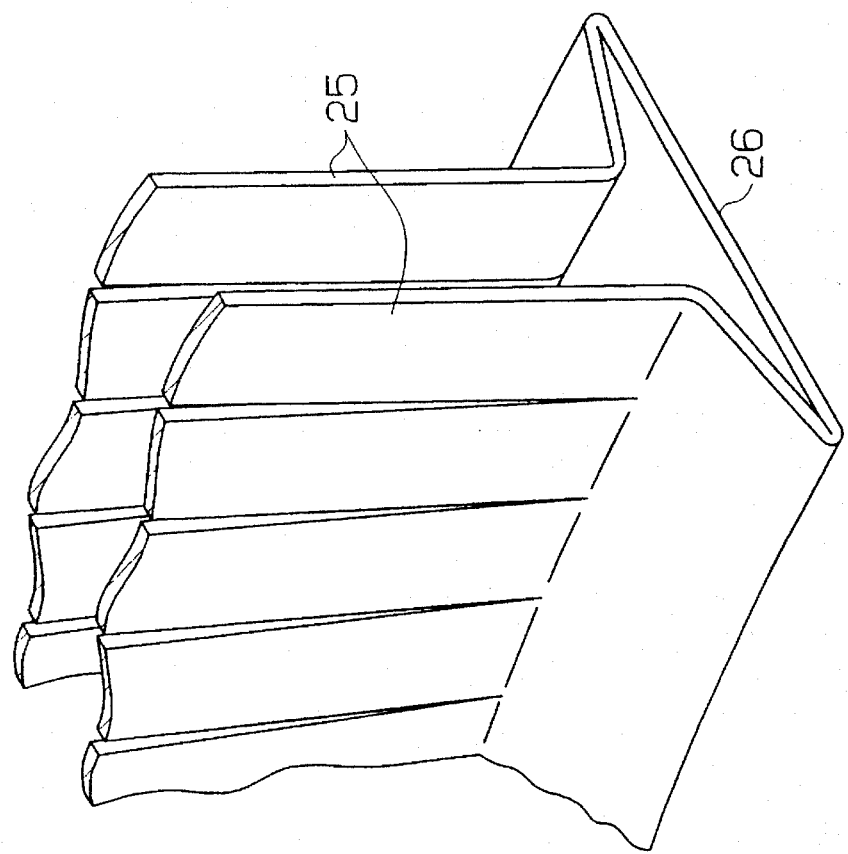
FIG. 3(a) is a partial perspective view showing a base of the fins.
Figure 3B:
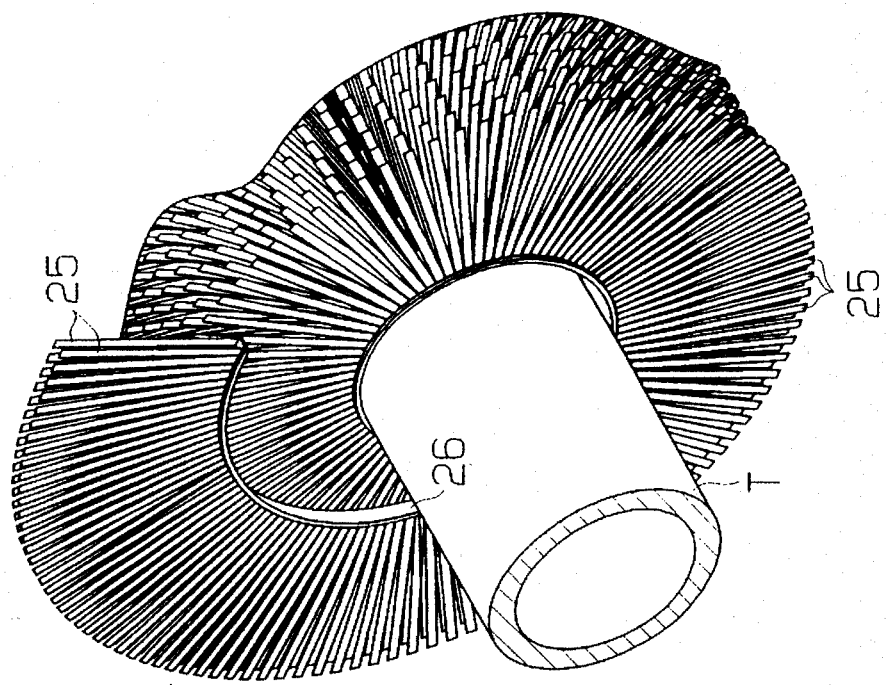
FIG. 3(b) is a partial perspective view showing attachment the fin to the radiating section.

Furthermore, the poriferous body 27 shown if FIG. 5(b) or the plurality of fins 25 shown in FIGS. 2 and 5(a) may be provided on the outer peripheral of the condenser 9. This will further improve the cooling efficiency of the compressed refrigerant gas passing through the condenser 9 and thus allow the condenser 9 and the fan 10 to be more compact.

Although only three embodiments of the present invention has been described herein, it should be apparent to those skilled in the art that the present invention may be embodied in many other specific forms without departing from the spirit or scope of the invention.

Particularly, it should be understood that the present invention may be embodied in the forms described below.

(a) Although the refrigerating circuit R of the above embodiments are arranged in a manner such that they come into contact with water collected in the drainage container 24, the present embodiment is not limited to such form. In other words, water collected in the drainage container 24 may be vaporized without utilizing the refrigerant circuit R. For, instance a heater, such as one having nichrome wires, may be provided in the drainage container 24 to vaporize the collected water.

(b) The opening of the drainage container 24 may be defined with a smaller area than the area of the bottom surface of the cooling chamber 3. In this case, the container 24 may be arranged to collect only the water discharged from the draining pipe 20a. As another option, the container 24 may be provided to collect water discharged from the draining pipe 20a and also a portion of the water which drops from the outer walls of the cooling chamber 3 and the outer surface of the refrigerating circuit R at the upstream and downstream sides of the refrigerating passageway 14. This will at least allow automatic vaporization of the water separated from the hot and humid air.

(c) In each of the above embodiments, instead of arranging the refrigerating passageway 14 inside the cooling chamber 3, the passageway 14 may be arranged in a manner such that it contacts the outer walls of the cooling chamber 3 to cool the interior of the chamber 3.

Therefore, the present examples and embodiments are to be considered as illustrative and not restrictive and the invention is not to be limited to the details given herein, but may be modified within the scope of the appended claims.

What is claimed is:

1. A gas dehumidifier having a gas passage to convey gas supplied from an external source, a first heat exchanger defined along a portion of said gas passage, and a refrigerant passage that conveys refrigerant and passes through said first heat exchanger, wherein heat exchange takes place in said first heat exchanger between gas passing through said gas passage and refrigerant flowing through said refrigerant passage to cool and dehumidify said gas, said dehumidifier comprising:

collecting means located beneath said first heat exchanger for collecting water separated from said gas during dehumidification;

vaporizing means for vaporizing water collected in said collecting means;

a housing accommodating said gas passage and said refrigerant passage, said housing having a bottom portion and an upper portion;

a cooling chamber enclosing said first heat exchanger, said cooling chamber being located at the upper portion of said housing and having outer walls and a bottom surface; and wherein said collecting means includes:

a drainage container located at the bottom portion of said housing and having an opening with an area larger than the bottom surface of said cooling chamber; and a water passage connecting said cooling chamber with said container, wherein water separated from said gas during dehumidification is drained from said cooling chamber into said container by way of said water passage.

2. The dehumidifier as set forth in claim 1, wherein said container is adapted to catch water condensed on the outer walls of said cooling chamber and water condensed on the outer surface of said refrigerant passage.

3. The dehumidifier as set forth in claim 1, wherein said refrigerant passage comprises:

a compressor provided to compress and discharge refrigerant;

a second heat exchanger connected to said compressor and arranged to pass inside said container, said second heat exchanger serving to conduct hot refrigerant compressed by said compressor and having an outer peripheral surface, wherein heat exchange takes place between said hot refrigerant and water in said container; and wherein said second heat exchanger is adapted to vaporize water collected in said container.

4. The dehumidifier as set forth in claim 3, wherein said vaporizing means includes a plurality of fins concentrated on and projecting from the outer peripheral surface of said second heat exchanger of refrigerant passage.

5. The dehumidifier as set forth in claim 4, wherein said fins are needle-like and project from a base, and wherein a tapered space is defined between adjacent fins such that the space is greater at distances further from said base.

6. The dehumidifier as set forth in claim 4, wherein said fins are formed by a spiral elongated metal plate wound about the outer peripheral surface of said second heat exchanger of said refrigerant passage, and wherein said metal plate is bent in the vicinity of its middle portion to define a base and projecting plates, and wherein said plates are cut at predetermined short intervals in the longitudinal direction thereof.

7. The dehumidifier as set forth in claim 6, wherein said elongated metal plate is made of a material having a high thermal conductivity.

8. The dehumidifier as set forth in claim 7, wherein said fins vaporize water, which is absorbed therein by capillary action from said container, with the heat transferred from said refrigerant passage.

9. The dehumidifier as set forth in claim 3, wherein said second heat exchanger includes a condenser which cools hot refrigerant discharged from said compressor.

10. The dehumidifier as set forth in claim 9, wherein said condenser is extended in a zigzag pattern in said container to enlarge the surface area to be cooled and to enhance heat exchange effectiveness.

11. A gas dehumidifier having a gas passage to convey gas supplied from an external source, a first heat exchanger defined along a portion of said gas passage, and a refrigerant passage that conveys refrigerant and passes through said first heat exchanger, wherein heat exchange takes place in said first heat exchanger between gas passing through said gas passage and refrigerant flowing through said refrigerant passage to cool and dehumidify said gas, said dehumidifier comprising:

collecting means located beneath said first heat exchanger for collecting water separated from said gas during dehumidification;

vaporizing means for vaporizing water collected in said collecting means;

a housing accommodating said gas passage and said refrigerant passage, said housing having a bottom portion and an upper portion;

a cooling chamber enclosing said first heat exchanger, said cooling chamber being located at the upper portion of said housing and having outer walls and a bottom surface;

a drainage container located in said housing;

a water passage connecting said cooling chamber with said container, wherein water separated from said gas during dehumidification is drained from said cooling chamber into said container by way of said water passage;

a compressor provided to compress and discharge refrigerant;

a second heat exchanger connected to said compressor and arranged to pass inside said container, said second heat exchanger serving to conduct hot refrigerant compressed by said compressor and having an outer peripheral surface, wherein heat exchange takes place between said hot refrigerant and water in said container, wherein said second heat exchanger is adapted to vaporize water collected in said container;

a lid for said container;

a first ventilation aperture provided in said lid to draw hot air into said container; and a second ventilation aperture provided in said lid to discharge vapor produced by vaporization of water collected in said container.

12. The dehumidifier as set forth in claim 11 further comprising:

a condenser section including a condenser defined at the downstream side of said second heat exchanger of said refrigerant passage;

a first fan disposed in the vicinity of said condenser to produce an air current and to cool the surface of said condenser section, wherein said air current which has received heat from said condenser is directed into said container through said first ventilation aperture; and a second fan disposed in the vicinity of said second ventilation aperture to discharge vapor from said container.

13. A gas dehumidifier having a gas passage extending inside a housing to convey gas supplied from an external source, wherein said housing has a bottom portion, a cooling chamber defined along a portion of said gas passage, a refrigerant passage extending through said cooling chamber to convey refrigerant, wherein heat exchange takes place inside said cooling chamber between gas passing through said gas passage and said refrigerant passage to cool and dehumidify said gas, said dehumidifier comprising:

a drainage container located at the bottom portion of said housing;

a water passage connecting said cooling chamber with said container to drain water, separated from said gas during dehumidification, to said container;

a heat exchanger connected to a compressor and extending through said container, said heat exchanger conducting a flow of hot refrigerant compressed by said compressor therethrough and having an outer peripheral surface, wherein heat exchange is performed between said hot refrigerant and water in said container to facilitate vaporization of the water; and wherein said heat exchanger is constructed to include a capillarity device to absorb water from the container by capillary action.

14. The dehumidifier as set forth in claim 13 further comprising a plurality of fins concentrated on and projecting from the outer peripheral surface of said heat exchanger of said refrigerant passage.

15. The dehumidifier as set forth in claim 14, wherein said fins are needle-like and project from a base, and wherein a tapered space is defined between adjacent fins such that the space is greater at distances further from said base, and wherein the tapered space causes capillary action.

16. A gas dehumidifier having a gas passage extending inside a housing to convey gas supplied from an external source, wherein said housing has a bottom portion, a cooling chamber defined along a portion of said gas passage, a refrigerant passage extending through said cooling chamber to convey refrigerant, wherein heat exchange takes place inside said cooling chamber between gas passing through said gas passage and said refrigerant passage to cool and dehumidify said gas, said dehumidifier comprising:

a drainage container located at the bottom portion of said housing;

a water passage connecting said cooling chamber with said container to drain water, separated from said gas during dehumidification, to said container; and a heat exchanger connected to a compressor and extending through said container, said heat exchanger conducting a flow of hot refrigerant compressed by said compressor therethrough and having an outer peripheral surface, wherein heat exchange is performed between said hot refrigerant and water in said container to facilitate vaporization of the water;

a plurality of fins concentrated on and protecting from the outer peripheral surface of said heat exchanger of said refrigerant passage, wherein said fins are formed by a spiral elongated metal plate would about the outer peripheral surface of said heat exchanger of said refrigerant passage, and wherein said metal plate is bent in the vicinity of its middle portion to define a base and projecting plates, and wherein said plates are cut at predetermined short intervals in the longitudinal direction thereof.

17. The dehumidifier as set forth in claim 16, wherein said elongated metal plate is made of a material having a high thermal conductivity.

18. The dehumidifier as set forth in claim 17, wherein said fins vaporize water, which is absorbed therein from said container by capillary action, with the heat transferred from said refrigerant passage.

19. The dehumidifier as set forth in claim 13, wherein said refrigerant passage includes a condenser which cools hot refrigerant discharged from said compressor in said heat exchanger.

20. The dehumidifier as set forth in claim 19, wherein said condenser is extended in a zigzag pattern in said container to enlarge the surface area to be cooled to enhance heat exchange.

21. The dehumidifier as set forth in claim 13 further comprising:

an inclined lid for said container;

a first ventilation aperture provided on said lid to draw hot air into said container; and a second ventilation aperture provided on said lid to discharge vapor from said container which is produced by vaporization of water collected in said container.

22. The dehumidifier as set forth in claim 21 further comprising:

a condenser section including a condenser defined at the downstream side of said heat exchanger of said refrigerant passage;

a first fan disposed in the vicinity of said condenser to produce an air current to cool the surface of said condenser section, wherein said air current which has received heat from said condenser is directed into said container through said first ventilation aperture; and a second fan disposed in the vicinity of said second ventilation aperture to discharge vapor from said container.

23. The dehumidifier as set forth in claim 13 further comprising a gas heat exchanger defined along a portion of said gas passage.

24. The dehumidifier as set forth in claim 13, wherein said first heat exchanger is arranged in a zigzag pattern to enlarge its effective surface area for performance of heat exchange and is provided with a plurality of fins on its surface.

25. The dehumidifier as set forth in claim 13, wherein said housing includes at least one ventilation hole.

26. A method for dehumidifying gas by cooling resulting from circulation of compressed refrigerant in a housing, wherein said method comprises the steps of:

cooling gas with refrigerant flowing through a refrigerant passage, which passes through a gas passage and thus separates water from said gas;

collecting said water separated from said gas in a container; and vaporizing water collected in said container with heat transferred through a heat exchanger from hot compressed refrigerant passing through said refrigerant passage, which extends through said container;

drawing water from said container into the heat exchanger with capillary action to facilitate the vaporization; and discharging vaporized water from the housing through a ventilation hole defined in the housing.

27. A method as set forth in claim 26 further including the steps of:

providing a cooling chamber in which the gas to be cooled flows, the cooling chamber having outer walls; and locating the container below the cooling chamber such that the container is positioned to further collect water that may condense and fall from an outer surface of the cooling chamber.

28. A gas dehumidifier according to claim 13, wherein the heat exchanger includes a plurality of fins, and narrow gaps are formed between adjacent fin parts such that the gaps serve as capillaries.

* * * * *